(12) United States Patent
Cahn

(10) Patent No.: US 11,416,753 B1
(45) Date of Patent: Aug. 16, 2022

(54) SYSTEMS AND METHODS TO IDENTIFY DOCUMENT TRANSITIONS BETWEEN ADJACENT DOCUMENTS WITHIN DOCUMENT BUNDLES

(71) Applicant: INSTABASE, INC., San Francisco, CA (US)

(72) Inventor: Daniel Benjamin Cahn, New York, NY (US)

(73) Assignee: Instabase, Inc., San Francisco, CA (US)

(*) Notice: Subject to any disclaimer, the term of this patent is extended or adjusted under 35 U.S.C. 154(b) by 0 days.

(21) Appl. No.: 17/361,798

(22) Filed: Jun. 29, 2021

(51) Int. Cl.
- *G06N 5/02* (2006.01)
- *G06N 5/00* (2006.01)
- *G06F 16/93* (2019.01)

(52) U.S. Cl.
CPC ............ *G06N 5/022* (2013.01); *G06F 16/93* (2019.01); *G06N 5/003* (2013.01)

(58) Field of Classification Search
CPC ......... G06N 5/022; G06N 5/003; G06F 16/93
See application file for complete search history.

(56) References Cited

U.S. PATENT DOCUMENTS

| | | | |
|---|---|---|---|
| 10,949,604 B1* | 3/2021 | Dwivedi | G06V 30/413 |
| 11,151,660 B1* | 10/2021 | Harding | G06Q 40/08 |
| 11,238,539 B1* | 2/2022 | Harding | G06N 20/00 |
| 2014/0032558 A1* | 1/2014 | Renders | G06V 30/418 |
| | | | 707/740 |
| 2018/0129944 A1* | 5/2018 | Meunier | G06N 20/00 |
| 2018/0276462 A1* | 9/2018 | Davis | G06V 10/273 |
| 2019/0006027 A1* | 1/2019 | Sacaleanu | G16H 50/30 |
| 2019/0026550 A1* | 1/2019 | Yang | G06V 10/25 |
| 2020/0394396 A1* | 12/2020 | Yanamandra | G06V 30/413 |
| 2021/0271805 A1* | 9/2021 | Comeau | G06F 16/31 |
| 2021/0294851 A1* | 9/2021 | Talwadker | G06V 30/40 |

OTHER PUBLICATIONS

Beeferman, Doug, Adam Berger, and John Lafferty. "Statistical models for text segmentation." Machine learning 34.1 (1999): 177-210. (Year: 1999).*

(Continued)

*Primary Examiner* — Kamran Afshar
*Assistant Examiner* — Randall K. Baldwin
(74) *Attorney, Agent, or Firm* — Esplin & Associates, PC (57) ABSTRACT

Systems and methods to identify document transitions between adjacent documents within document bundles are disclosed. Exemplary implementations may train a model: obtain training information including a first training bundle and corresponding document separation markers; determine page-specific feature information pertaining to individual pages of the first training bundle; determine, based on the obtained page-specific feature information, page-specific feature values for individual features of the individual pages of the first training bundle; generate, for the individual pages of the first training bundle, a page-specific feature vector; train the model, using the training document bundles, to determine whether the first page and the second page are part of different document. Systems and methods may utilize the trained model to identify document transitions between adjacent documents within document bundles.

8 Claims, 7 Drawing Sheets

(56) References Cited

OTHER PUBLICATIONS

Collins-Thompson, Kevyn, and Radoslav Nickolov. "A clustering-based algorithm for automatic document separation." SIGIR 2002 Workshop on Information Retrieval and OCR: From Converting Content to Grasping, Meaning, Tampere, Finland. 2002. (Year: 2002).*

Esposito, Floriana, et al. "Automatic content-based indexing of digital documents through intelligent processing techniques." Second International Conference on Document Image Analysis for Libraries (DIAL'06). IEEE, 2006. (Year: 2006).*

Hamdi, Ahmed, et al. "Feature selection for document flow segmentation." 2018 13th IAPR International Workshop on Document Analysis Systems (DAS). IEEE, 2018. (Year: 2018).*

\* cited by examiner

SYSTEMS AND METHODS TO IDENTIFY DOCUMENT TRANSITIONS BETWEEN ADJACENT DOCUMENTS WITHIN DOCUMENT BUNDLES

FIELD OF THE DISCLOSURE

The present disclosure relates to systems and methods to identify document transitions between adjacent documents within document bundles.

BACKGROUND

Multiple, separate documents may be combined into a single document bundle and may be stored in a single electronic file for various reasons, such as file transfer. Automated content extraction of electronic documents is known. Training models to make certain classifications or decisions is known, for example as used in machine learning.

SUMMARY

One aspect of the present disclosure includes a system configured to identify document transitions between adjacent documents within document bundles. A document bundle may be a combination of two or more documents stored in a single electronic file. The system may be configured to obtain training information. The training information may include training document bundles and corresponding document separation markers. The training document bundles may include a first training bundle. The first training bundle may combine at least a first document and a second document. A document separation marker may indicate where a document transition occurs. A document transition may be a page break in the first training bundle where the first document ends and the second document begins. The first document may include a first page. The second document may include a second page. The system may be further configured to determine page-specific feature information pertaining to individual pages of the first training bundle. The page-specific information pertaining to an individual page may characterize features of the individual page for which feature information is obtained. The page-specific feature information may include first page-specific feature information pertaining to the first page and second page-specific feature information pertaining to the second page. The system may be further configured to determine, based on the obtained page-specific feature information, page-specific feature values for individual features of the individual pages of the first training bundle. The page-specific feature values may numerically represent the individual features of the individual pages. First page-specific feature values may be determined for the first page, based on the first page-specific feature information. Second page-specific feature values may be determined for the second page, based on the second page-specific feature information. The system may be further configured to generate, for the individual pages of the first training bundle, a page-specific feature vector. A first page-specific feature vector pertaining to the first page may be generated and may be based on the first page-specific feature values. A second page-specific feature vector pertaining to the second page may be generated and may be based on the second page-specific feature values. The individual page-specific feature vectors may have a fixed dimension. The system may be further configured to train a model, using the training document bundles, to determine whether the first page and the second page are part of different documents. The model may make a determination based on comparing the first page-specific feature vector and the second page-specific feature vector. Training the model may include comparing the determination with the obtained corresponding document separation markers.

Another aspect of the present disclosure includes a system configured to utilize a trained model to identify document transitions between adjacent documents within document bundles. The system may be configured to store, in electronic storage, the trained model. The trained model may have been trained to determine whether a first training page and a second training page are part of different documents. The trained model may have been trained to make a determination based on comparing a first training-page-specific feature vector pertaining to the first training page and the second training-page-specific feature vector pertaining to the second training page. The first training-page-specific feature vector may be based on a first set of page-specific feature values that numerically represent individual features of the first training page. The second training-page-specific feature vector may be based on a second set of page-specific feature values that numerically represent individual features of the second training page. The system may be further configured to obtain a set of unseparated document bundles. The set of unseparated document bundles may include a first unseparated document bundle. The first unseparated document bundle may be stored in a single electronic file. The first unseparated document bundle may include a first page and a second page. The system may be further configured to determine page-specific feature information pertaining to individual pages of the first unseparated bundle. The page-specific information pertaining to an individual page may characterize features of the individual page for which feature information is obtained. The system may be further configured to determine, based on the obtained page-specific feature information, page-specific feature values for individual features of the individual pages of the first unseparated bundle. The page-specific feature values may numerically represent the individual features for which feature information is obtained. First page-specific feature values may be determined for the first page and second page-specific feature values may be determined for the second page. The system may be further configured to generate, for individual pages of the first unseparated bundle, a page-specific feature vector. A first page-specific feature vector pertaining to the first page may be generated and may be based on the first page-specific feature values. A second page-specific feature vector pertaining to the second page may be generated and may be based on the second page-specific feature values. The individual page-specific feature vectors may have a fixed dimension. The system may be further configured to make a determination, using the trained model, whether the first page and the second page are part of different documents. The determination may be based on a comparison of the first page-specific feature vector and the second page-specific feature vector. Determining that the first page and the second page are part of different documents may indicate that a document transition occurs between the first page and the second page. The system may be further configured to present to the user, via a user interface, whether the document transition occurs between the first page and the second page, based on the determination.

Another aspect of the present disclosure includes a method configured to identify document transitions between adjacent documents within document bundles. A document bundle may be a combination of two or more documents stored in a single electronic file. The method may comprise obtaining training information. The training information may include training document bundles and corresponding document separation markers. The training document bundles may include a first training bundle. The first training bundle may combine at least a first document and a second document. A document separation marker may indicate where a document transition occurs. A document transition may be a page break in the first training bundle where the first document ends and the second document begins. The first document may include a first page. The second document may include a second page. The method may further comprise determining page-specific feature information pertaining to individual pages of the first training bundle. The page-specific information pertaining to an individual page may characterize features of the individual page for which feature information is obtained. The page-specific feature information may include first page-specific feature information pertaining to the first page and second page-specific feature information pertaining to the second page. The method may further comprise determining, based on the obtained page-specific feature information, page-specific feature values for individual pages of the first training bundle. The page-specific feature values may numerically represent the individual features of the individual pages. First page-specific feature values may be determined for the first page, based on the first page-specific feature information. Second page-specific feature values may be determined for the second page, based on the second page-specific feature information. The method may further comprise generating, for the individual pages of the first training bundle, a page-specific feature vector. A first page-specific feature vector pertaining to the first page may be generated and may be based on the first page-specific feature values. A second page-specific feature vector pertaining to the second page may be generated and may be based on the second page-specific feature values. The individual page-specific feature vectors may have a fixed dimension. The method may further comprise training a model, using the training document bundles, to determine whether the first page and the second page are part of different documents. The model may make a determination based on comparing the first page-specific feature vector and the second page-specific feature vector. Training the model may include comparing the determination with the obtained corresponding document separation markers.

Another aspect of the present disclosure includes a method configured to utilize a trained model to identify document transitions between adjacent documents within document bundles. The method may comprise storing, in electronic storage, the trained model. The trained model may have been trained to determine whether a first training page and a second training page are part of different documents. The trained model may have been trained to make a determination based on comparing a first training-page-specific feature vector pertaining to the first training page and the second training-page-specific feature vector pertaining to the second training page. The first training-page-specific feature vector may be based on a first set of page-specific feature values that numerically represent individual features of the first training page. The second training-page-specific feature vector may be based on a second set of page-specific feature values that numerically represent individual features of the second training page. The method may further comprise obtaining a set of unseparated document bundles. The set of unseparated document bundles may include a first unseparated document bundle. The first unseparated document bundle may be stored in a single electronic file. The first unseparated document bundle may include a first page and a second page. The method may further comprise determining page-specific feature information pertaining to individual pages of the first unseparated bundle. The page-specific information pertaining to an individual page may characterize features of the individual page for which feature information is obtained. The method may further comprise determining, based on the obtained page-specific feature information, page-specific feature values for individual features of the individual pages of the first unseparated bundle. The page-specific feature values may numerically represent the individual features for which feature information is obtained. First page-specific feature values may be determined for the first page and second page-specific feature values may be determined for the second page. The method may further comprise generating, for individual pages of the first unseparated bundle, a page-specific feature vector. A first page-specific feature vector pertaining to the first page may be generated and may be based on the first page-specific feature values. A second page-specific feature vector pertaining to the second page may be generated and may be based on the second page-specific feature values. The individual page-specific feature vectors may have a fixed dimension. The method may further comprise making a determination, using the trained model, whether the first page and the second page are part of different documents. The determination may be based on a comparison of the first page-specific feature vector and the second page-specific feature vector. Determining that the first page and the second page are part of different documents may indicate that a document transition occurs between the first page and the second page. The method may further comprise presenting to the user, via a user interface, whether the document transition occurs between the first page and the second page, based on the determination.

As used herein, any association (or relation, or reflection, or indication, or correspondency) involving servers, processors, client computing platforms, models, documents, document bundles, document separation markers, page breaks, feature information, values, feature values, vectors, feature vectors, pages, presentations, obtained information, user interfaces, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "determine" (and derivatives thereof) may include measure, calculate, compute, estimate, approximate, extract, generate, and/or otherwise derive, and/or any combination thereof. As used herein, the term "generate" (and derivatives thereof) may include derive, construct, compile, create, produce, form, build, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
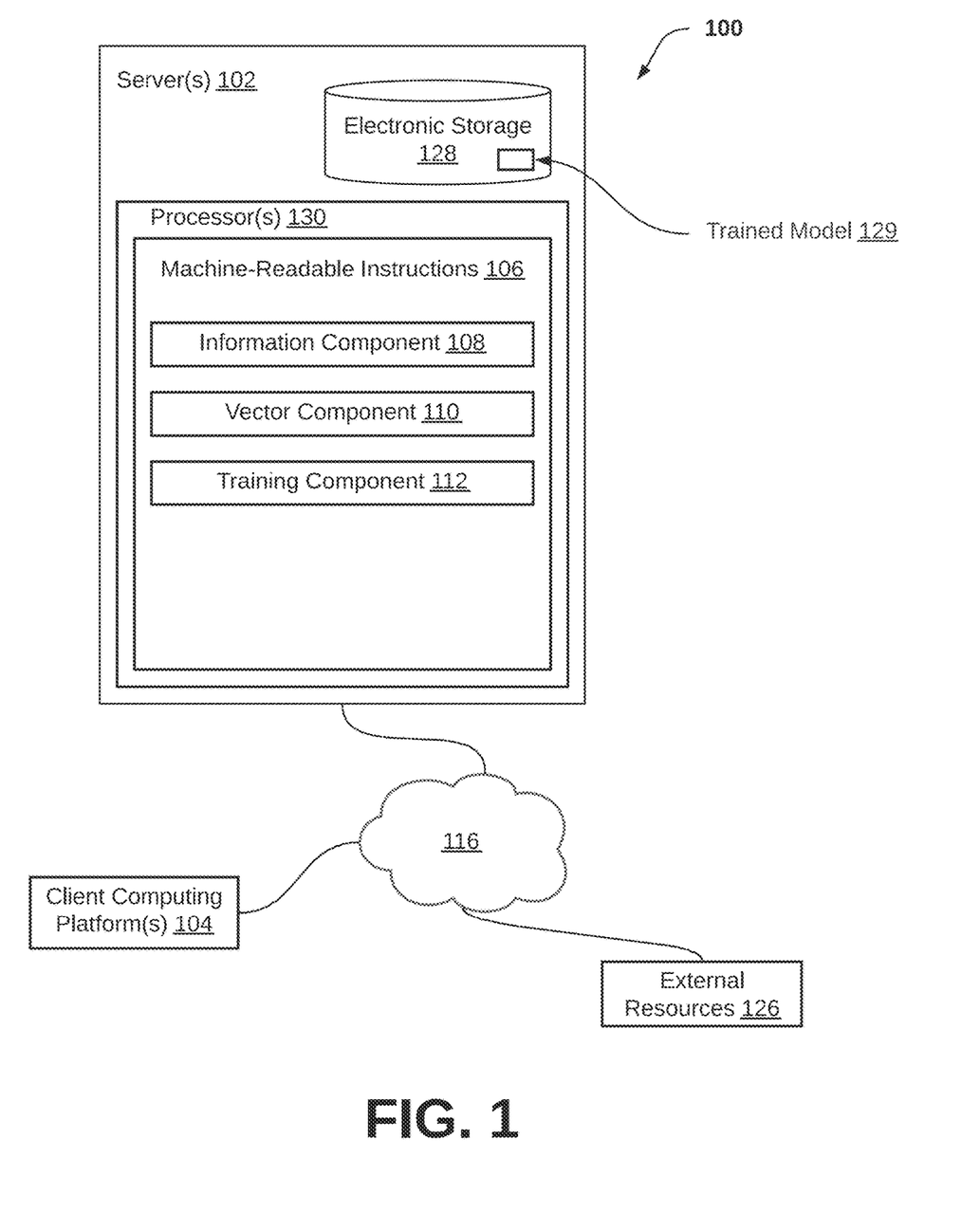
FIG. 1 illustrates a system configured to identify document transitions between adjacent documents within document bundles, in accordance with one or more implementations.

FIG. 1 illustrates a system 100 configured to identify document transitions between adjacent documents within document bundles, in accordance with one or more implementations. A document bundle may be a combination of two of more separate documents and/or may be stored in a single electronic file. In some implementations, the document bundle may be stored in one or more of a portable document format (PDF), document format (DOC), Excel spreadsheet (XLS), HTML, portable network graphic format (PNG), Joint Photographic Experts Group format (JPG), tagged image file (TIF), and/or other file formats. An individual document in a document bundle may include one or more pages. The one or more pages may be arranged in sequential order or may be arranged out of sequential order.

In some implementations, system 100 may include one or more servers 102 and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of information component 108, vector component 110, training component 112, and/or other instruction components.

Information component 108 may be configured to obtain training information. The training information may include training document bundles, document separation markers, and/or other information. The training document bundles may include a first training bundle, and/or may further include other training document bundles. The first training bundle may combine at least a first document, a second document and/or other documents. The first document may include a first page and/or other pages. The second document may include a second page and/or other pages. The training bundles may correspond to one or more document separation markers in the obtained training information and/or other training information. The document separation markers may be stored in one or more of a text file, a binary file, and/or other file formats and/or may be obtained from the user. In some implementations, training document bundles may be artificially generated by one or more machine learning algorithms, generated by the user, and/or obtained using other methods. The training document bundles may include one or more of concatenated documents, concatenated final pages of documents, and/or concatenated starting pages of document. By way of non-limiting example, a training document bundle may include one or more complete documents, such that the starting page, the final page, and/or intermediate pages are included for individual ones of the documents. By way of non-limiting example, a training document bundle may include one or more incomplete documents, such that the starting page and/or the final page are included for individual ones of the documents. A document separation marker may indicate where a document transition occurs. A document transition may be a page break in the first document bundle where the first document ends and the second document begins. In some implementations, the first training bundle may have indexed page-breaks (e.g., page break 0, page break 1, page break 2, etc.) that indicate positions in the document bundle between different pages. The training information may include 10 s, or 100 s, or 1000 s of training document bundles, together with corresponding document separation markers, and/or other information.

Information component 108 may be further configured to determine page-specific feature information pertaining to individual pages of the first training bundle. The page-specific feature information pertaining to an individual page may characterize features of the individual page for which feature information is obtained. Features may include one or more of page number, page size, resolution, predominant font used, presence of one or more signatures, word usage, formatting style, and/or other page information. In some implementations, features for which feature information is obtained may be selected by one or more of machine learning algorithms, machine learning processes (e.g. a convolutional neural network), and/or manually selected by the user and/or other methods. By way of non-limiting example, page-specific feature information pertaining to a first page may include the predominant use of Times New Roman font and/or other fonts. The page-specific feature information may further include the page having a page number of 4 and/or other page numbers. In some implementations, page-specific feature information may characterize 5 features, 15, features, 50 features, and/or other numbers of features pertaining to a particular page. In some implementations, the page-specific feature information pertaining to pages may characterize a different number of features. By way of non-limiting example, a document bundle may include a first page, a second page, and/or other pages. First page-specific feature information may be determined and may pertain to the first page. The first page-specific feature information may characterize 25 features in the first page. Second page-specific feature information may be determined and may pertain to the second page. The second page-specific feature information may characterize 15 features in the second page. In some implementations, page-specific feature information may characterize the same number of features for all pages for which page-specific feature information is obtained. By way of non-limiting example, a document bundle may include a first page, a second page, and/or other pages. First page-specific feature information may be determined and may pertain to the first page. Second page-specific feature information may be determined and may pertain to the second page. First page-specific feature information and second page-specific feature information may characterize the same number of features. The features characterized by the first page-specific feature information may be the same features characterized by the second page-specific feature information.

Vector component 110 may be configured to determine, based on the obtained page-specific feature information, page-specific feature values for individual features of the individual pages of the first training bundle. By way of non-limiting example, first page-specific feature values may be determined for the first page, based on the first page-specific feature information, and second page-specific feature values may be determined for the second page, based on the second page-specific feature information. The page-specific feature values may numerically represent the individual features of the individual pages. Individual features may have a number of possible variations and/or alternatives. Different variations of a particular feature may be determined to have different feature values. For example, a feature may be predominant font. The predominant font may have one or more variations that may include Times New Roman font, Arial font, Helvetica font, Gotham font, Baskerville font, and/or other fonts. A first page may have a predominant font that is Times New Roman font, a second page may have a predominant font that is Arial font. Times New Roman may be numerically represented as '5' and Arial font may be numerically represented as '13'. A first feature value based on predominant font may be determined to be '5' for the first page. A second feature value based on predominant font may be determined to be '13' for the second page. In some implementations, numerical values may be binary values. The binary values may represent the presence or absence of a given feature. For example, a first feature may be the presence of a signature on a page. A feature value of '1' may indicate that there is a signature on the page and a feature value of '0' may indicate that there is not a signature on the page. One or more pages that include a signature may have a feature value of '1' that is determined based on page-specific feature information. One or more pages that do not include a signature may have a feature value of '0' that is determined based on page-specific feature information.

Vector component 110 may be further configured to generate, for the individual pages of the training bundles, a page-specific feature vector. A first page-specific feature vector pertaining to the first page may be generated and may include and/or be based on the first page-specific feature values. A second page-specific feature vector pertaining to the second page may be generated and may include and/or be based on the second page-specific feature values. The individual page-specific feature vectors may have a fixed dimension. The fixed dimension of the page-specific feature vectors may be based on one or more of the number of features characterized by the page-specific feature information, the number of feature values determined for the individual pages, the size and/or numerical value of the one or more feature values, and/or other information. In some implementations, page-specific feature vectors may include one or more sets of bits. The individual sets of bits may be defined by the index of the first bit in the set, the length of the set of bits, and/or other information. Individual sets of bits may include 4 bits, 8 bits, 16 bits, 32 bits, and/or other numbers of bits. In some implementations, individual sets of bits may encode numerical values for individual features. By way of non-limiting example, a first page-specific feature vector may include a first set of bits and a second set of bits. The first set of bits may encode a first feature value that numerically represents a first feature. The second set of bits may encode a second feature value that numerically represents a second feature.

Training component 112 may be configured to train a model, using the training document bundles, to determine whether the first page and the second page are part of different documents. The model may make a determination based on comparing the first page-specific feature vector and the second page-specific feature vector. In some implementations, comparing the first page-specific feature vector and the second page-specific feature vector may include one or more comparisons of one or more sets of bits included in the first page-specific feature vector and one or more sets of bits included in the second page-specific feature vector. By way of non-limiting example, the first page-specific feature vector may include a first set of bits and the second page-specific feature vector may include a second set of bits. The first set of bits and the second set of bits may have the same bit length. The first set of bits and the second set of bits may encode feature values that are based on a first feature. The first bit of the first set of bits and the first bit of the second set of bits may have the same index within their respective page-specific feature vectors. Comparison of the first page-specific feature vector and the second page-specific feature vector may include a comparison of the first set of bits and the second set of bits. In some implementations, the first set of bits and the second set of bits may have similar encoded values. Similar encoded values may indicate the first feature is the same or similar on the first page and the second page.

In some implementations, the determination whether the first page and the second page are part of different documents may be based on comparisons of n-sets of bits in the first page-specific feature vector with corresponding n-sets of bits in the second page-specific feature vector. For example, the 0-set of bits in the first page-specific feature vector corresponds with the 0-set of bits in the second page-specific feature vector, the 1-set of bits in the first page-specific feature vector corresponds with the 1-set of bits in the second page-specific feature vector, the 2-set of bits in the first page-specific feature vector corresponds with the 2-set of bits in the second page-specific feature vector, and so on and so forth. In some implementations, the comparison of the n-sets of bits of the first page-specific feature vector and the n-sets of bits of the second page-specific feature vector may include a calculation of a distance vector. The distance vector may be defined in an n-dimensional space. The n-dimensional space may be determined by the number of features for which page-specific feature information is obtained and/or by the number of sets of bits included in the page-specific feature vectors being compared, such that individual dimensions of the n-dimensional space corresponds to an individual feature. The distance vector may be determined by comparing individual pairs of corresponding sets of bits from the first page-specific feature vector and the second page-specific feature vector. In some implementations, a distance vector may have a large value and indicate large differences in the features of the first page and the second page. In some implementations, a distance vector may have a small value and indicate smaller differences in the features of the first page and the second page. By way of non-limiting example, a distance vector with a small value may indicate the first page and the second page are part of the same document. A distance vector with a large value may indicate the first page and the second page are part of different documents.

Training the model may include comparing the determination with the obtained corresponding document separation markers. Training the model may be done gradually, over 10 s, 100 s, or 1000 s of training document bundles with corresponding document separation markers, and/or other training information.

In some implementations, training the model may include construction of a decision tree and/or usage of other types of machine learning processes. The decision tree may be constructed based on comparisons of page pairs of the training document bundles, such that individual page pairs include a first page and a second page of the training document bundles. In some implementations, the first page-specific feature vector and the second page-specific feature vector may have the same dimension. The first set of bits at a given index of the first page-specific feature vector may represent the same feature as a second set of bits at the same given index of the second page-specific feature vector. The first set of bits and the second set of bits may have the same bit length.

In some implementations, the decision tree may include one or more nodes. The nodes may be separated into one or more tree levels. Comparisons between the first page-specific feature vector and the second page-specific feature vector may include traversing through the one or more tree levels of the decision tree. The comparison of the first page-specific feature vector and the second page-specific feature vector may include a comparison of the first set of bits of the first page-specific feature vector and the second set of bits of the second page-specific feature vector. Comparison of the first set of bits of the first page-specific feature vector with the second set of bits of the second page-specific feature vector may result in a determination and/or further determinations. Individual determinations may effectuate individual transitions in the decision tree from a first node in a first tree level to a second node in a second tree level, and so on and so forth.

Figure 2:
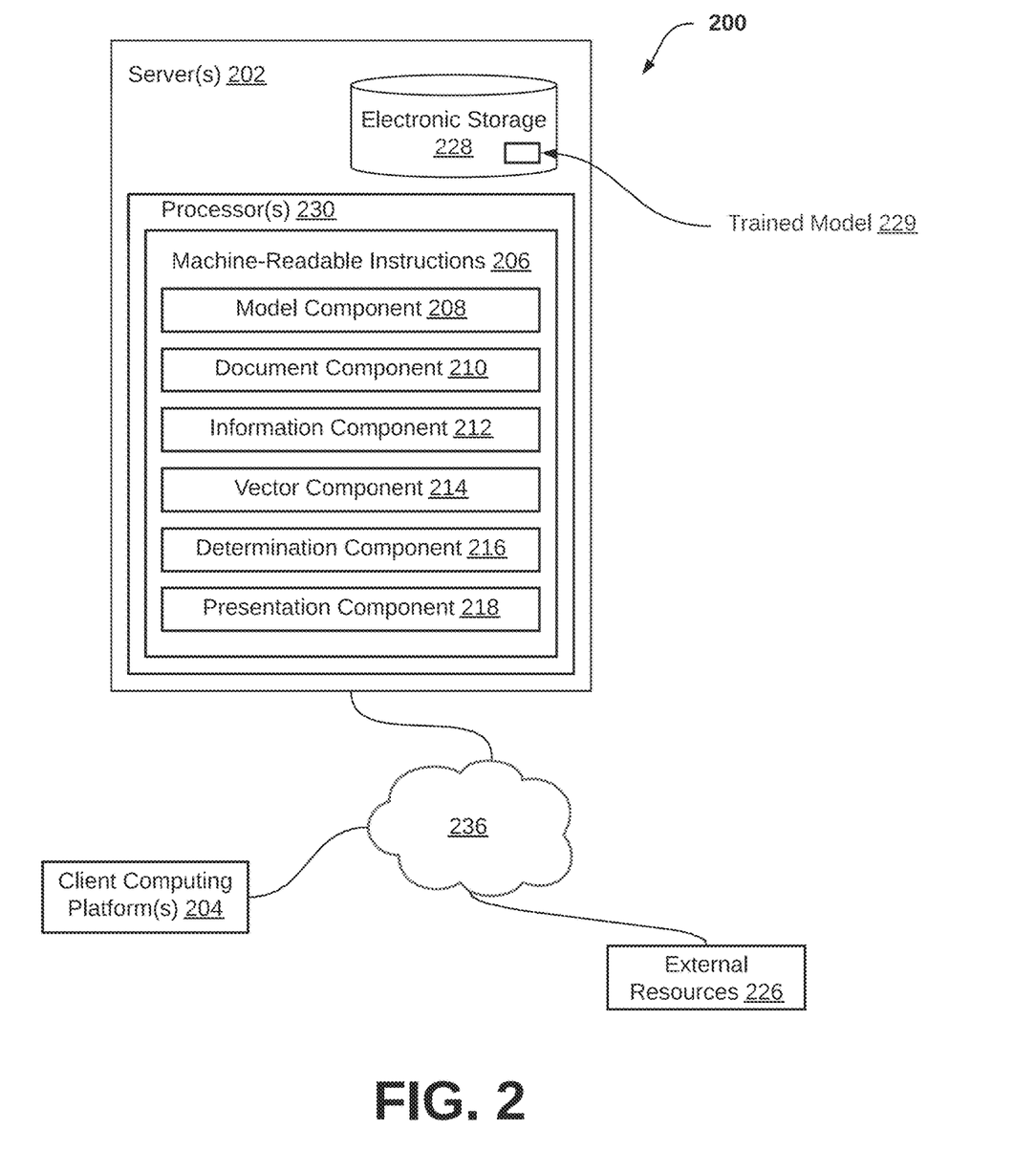
FIG. 2 illustrates a system configured to utilize a trained model to identify document transitions between adjacent documents within document bundles, in accordance with one or more implementations.

FIG. 2 illustrates a system 200 configured to utilize a trained model 229 to identify document transitions between adjacent documents within document bundles, in accordance with one or more implementations. In some implementations, system 200 may include one or more servers 202 and/or other components.

Server(s) 202 may be configured by machine-readable instructions 206. Machine-readable instructions 206 may include one or more instruction components. The instruction components may include computer program components. The instruction components may include one or more of model component 208, document component 210, information component 212, vector component 214, determination component 216, presentation component 218, and/or other instruction components.

Model component 208 may be configured to store, in electronic storage 228, a trained model 229. Trained model 229 may have been trained to determine whether a first training page and a second training page are part of different documents. Trained model 229 may make a determination based on comparing a first training-page-specific feature vector pertaining to the first training page and the second training-page-specific feature vector pertaining to the second training page. The first training-page-specific feature vector may include a first set of page-specific feature values that numerically represent individual features of the first training page. The second training-page-specific feature vector may include a second set of page-specific feature values that numerically represent individual features of the second training page.

Document component 210 may be configured to obtain a set of unseparated document bundles. The set of unseparated document bundles may include a first unseparated document bundle and/or may include other unseparated document bundles. The first unseparated document bundle may be stored in a single electronic file. The first unseparated document bundle may include a first page and a second page.

Information component 212 may be configured to determine page-specific feature information pertaining to individual pages of the first unseparated bundle. The page-specific information pertaining to an individual page may characterize features of the individual page for which feature information is obtained. In some implementations, determination and/or selection of these features may be the same or similar as determination of the features by information component 108.

Vector component 214 may be configured to determine, based on the obtained page-specific feature information, page-specific feature values for individual features of the individual pages of the first unseparated bundle. The page-specific feature values may numerically represent the individual features for which feature information is obtained. First page-specific feature values may be determined for the first page and second page-specific feature values may be determined for the second page. In some implementations, determination of these feature values may be the same or similar feature values as determination of the feature values by vector component 110.

Vector component 214 may be further configured to generate, for individual pages of the first unseparated bundle, a page-specific feature vector. A first page-specific feature vector pertaining to the first page may be generated and may include and/or be based on the first page-specific feature values. A second page-specific feature vector pertaining to the second page may be generated and may include and/or be based on the second page-specific feature values. The individual page-specific feature vectors may have a fixed dimension. In some implementations, generation of these feature vectors may be the same or similar feature values as the generation of the feature vectors by vector component 110.

Determination component 216 may be configured to determine, using a trained model, whether the first page and the second page are part of different documents. In some implementations, the trained model may have been trained by training component 112. Determinations made by determination component 216 may be based on a comparison of the first page-specific feature vector and the second page-specific feature vector. The determination that the first page and the second page are part of different documents may indicate that a document transition occurs between the first page and the second page.

Presentation component 218 may be configured to present, via a user interface, whether a document transition occurs between the first page and the second page, based on one or more determinations made by determination component 216.

Functions executed by the components of system 100 may occur prior to execution of system 200 such that system 100 trains the model 229 (depicted in FIG. 2) prior to utilizing the trained model. Upon training, the model may be stored to electronic storage 228. Upon any further training, the model may be re-stored in and/or updated to electronic storage 228.

In some implementations, server(s) 102, client computing platform(s) 104, and/or external resources 126 may be operatively linked via one or more electronic communication links. For example, such electronic communication links may be established, at least in part, via one or more networks 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. By interfacing with system 100, the one or more processors configured to execute the computer program modules of the given client computing platform 104 may improve functionality of the given client computing platform 104 such that the given client computing platform 104 functions more than a generic client computing platform thereon out. Upon interfacing with system 100, a computer-automated process may be established and/or improved of the given client computing platform 104.

External resources 126 may include sources of information outside of system 100, external entities participating with system 100, and/or other resources. For example, in some implementations, external resources 126 may include one or more servers configured to provide computational resources that may be used to train the model. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network (e.g., one or more networks 116) and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores trained model 129 and/or other information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. These mechanisms for electronically processing information that may serve as processor(s) 130 may transforms and/or improve server(s) 102 such that server(s) 102 function to accomplish a specific purpose. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Referring to FIG. 2, server(s) 202 may include electronic storage 228, one or more processors 230, and/or other components. Server(s) 202 may include communication lines, or ports to enable the exchange of information with a network 236 external resources 226, and/or other computing platforms 204. Illustration of server(s) 202 in FIG. 2 is not intended to be limiting. Server(s) 202 may include a plurality of hardware, software, and/or firmware components operating together to provide the functionality attributed herein to server(s) 202. For example, server(s) 202 may be implemented by a cloud of computing platforms 204 operating together as server(s) 202. External resources 226 may include sources of information outside of system 200, external entities participating with system 200, and/or other resources.

Referring to FIG. 2, electronic storage 228 may comprise non-transitory storage media that electronically stores information. The electronic storage media of electronic storage 228 may include one or both of system storage that is provided integrally (i.e., substantially non-removable) with server(s) 202 and/or removable storage that is removably connectable to server(s) 202 via, for example, a port (e.g., a USB port, a firewire port, etc.) or a drive (e.g., a disk drive, etc.). Electronic storage 228 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 228 may include one or more virtual storage resources (e.g., cloud storage, a virtual private network, and/or other virtual storage resources). Electronic storage 228 may store software algorithms, information determined by processor(s) 230, information received from server(s) 202, and/or other information that enables server(s) 202 to function as described herein.

Referring to FIG. 2, processor(s) 230 may be configured to provide information processing capabilities in server(s) 202. As such, processor(s) 230 may include one or more of a digital processor, an analog processor, a digital circuit designed to process information, an analog circuit designed to process information, a state machine, and/or other mechanisms for electronically processing information. Although processor(s) 230 is shown in FIG. 2 as a single entity, this is for illustrative purposes only. In some implementations, processor(s) 230 may include a plurality of processing units. These processing units may be physically located within the same device, or processor(s) 230 may represent processing functionality of a plurality of devices operating in coordination. Processor(s) 230 may be configured to execute components 208, 210, 212, 214, 216, and/or 218, and/or other components. Processor(s) 230 may be configured to execute components 208, 210, 212, 214, 216, and/or 218, and/or other components by software; hardware; firmware; some combination of software, hardware, and/or firmware; and/or other mechanisms for configuring processing capabilities on processor(s) 230. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 208, 210, 212, 214, 216, and/or 218 are illustrated in FIG. 2 as being implemented within a single processing unit, in implementations in which processor(s) 220 includes multiple processing units, one or more of components 208, 210, 212, 214, 216, and/or 218 may be implemented remotely from the other components. The description of the functionality provided by the different components 208, 210, 212, 214, 216, and/or 218 described below is for illustrative purposes, and is not intended to be limiting, as any of components 208, 210, 212, 214, 216, and/or 218 may provide more or less functionality than is described. For example, one or more of components 208, 210, 212, 214, 216, and/or 218 may be eliminated, and some or all of its functionality may be provided by other ones of components 208, 210, 212, 214, 216, and/or 218. As another example, processor(s) 220 may be configured to execute one or more additional components that may perform some or all of the functionality attributed below to one of components 208, 210, 212, 214, 216, and/or 218.

Figure 5A:
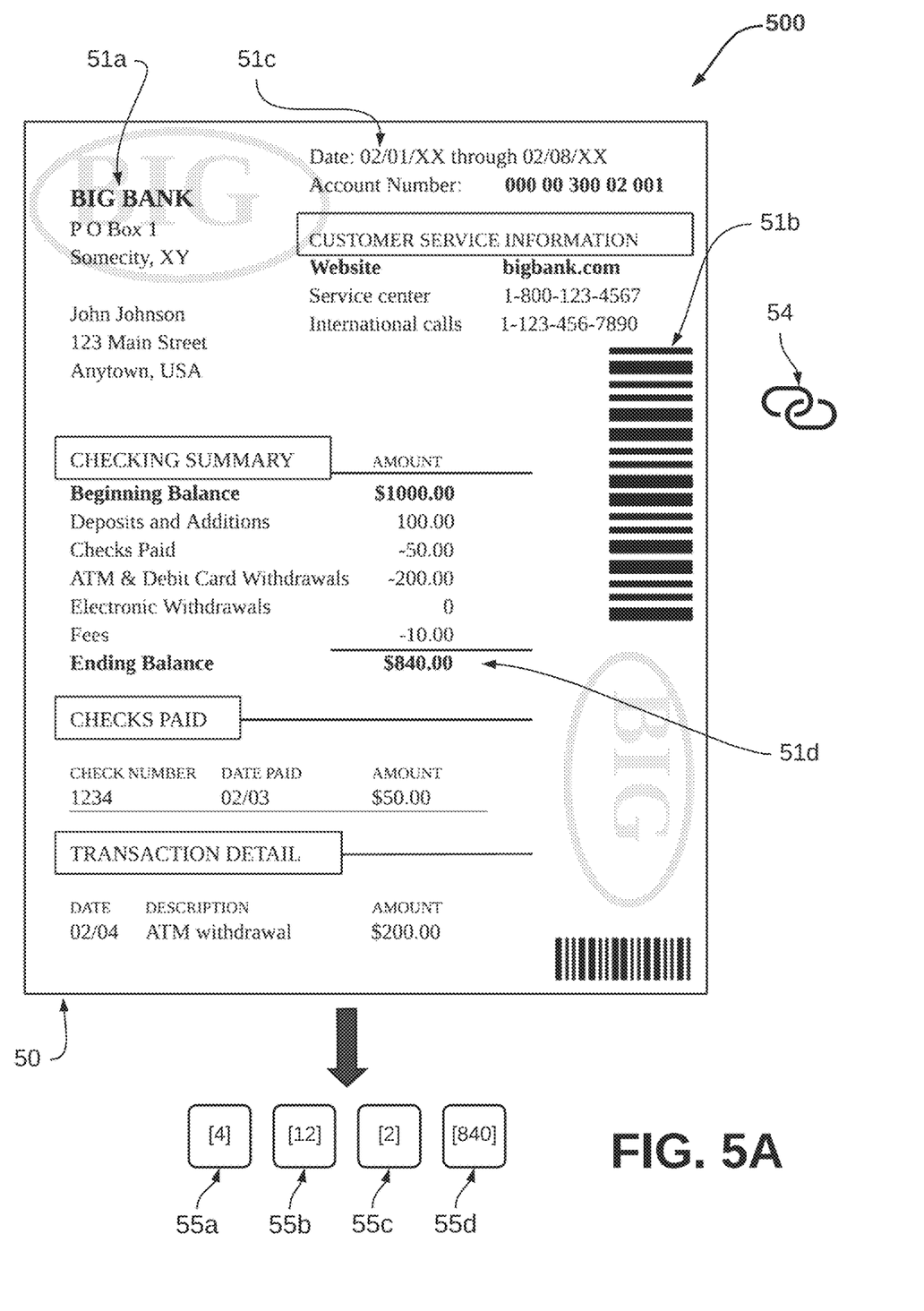
FIGS. 5A-5B-5C illustrate exemplary scenarios of usage of a system configured to identify document transitions between adjacent documents within document bundles, in accordance with one or more implementations.
Figure 5B:
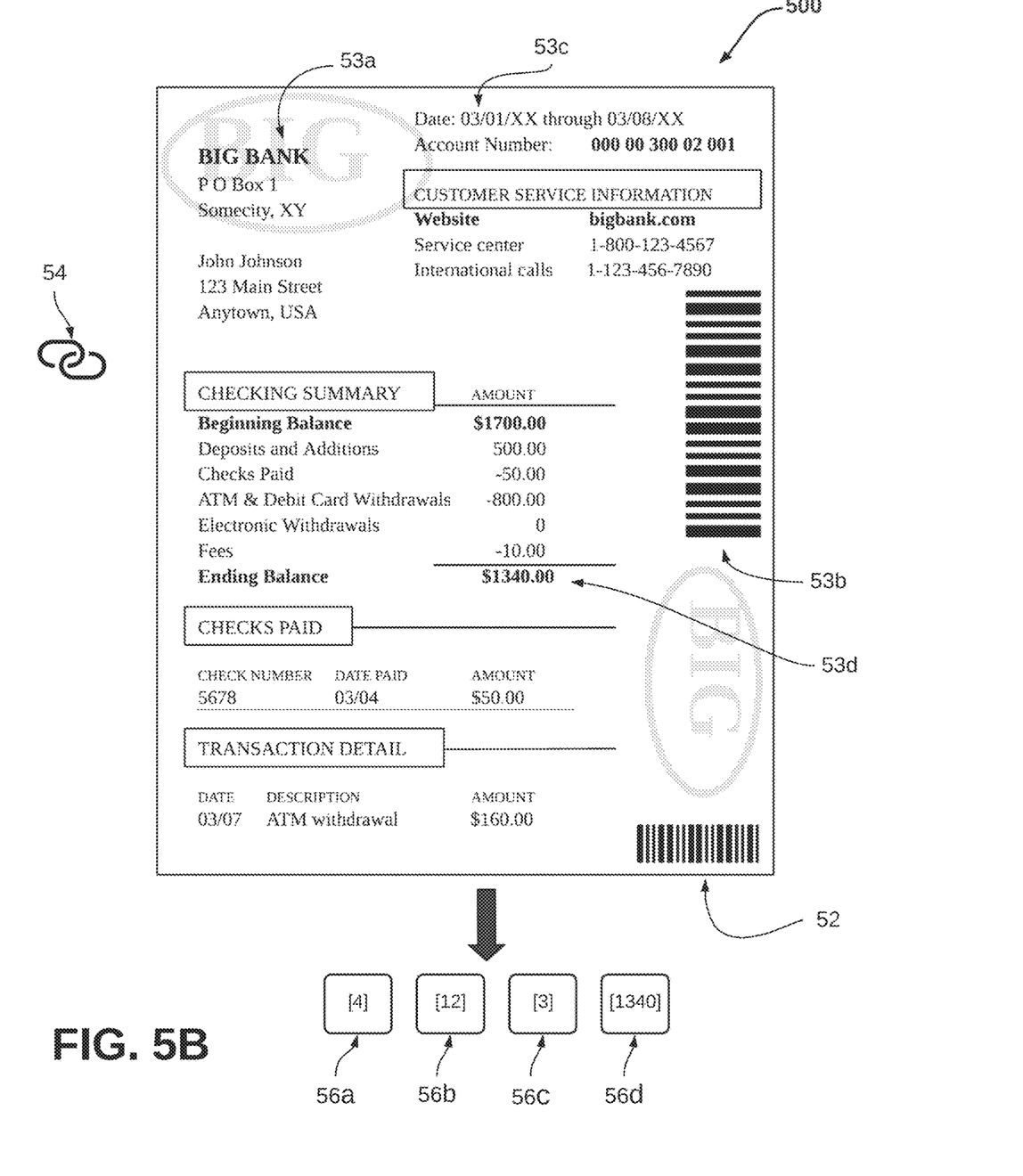
Figure 5C:
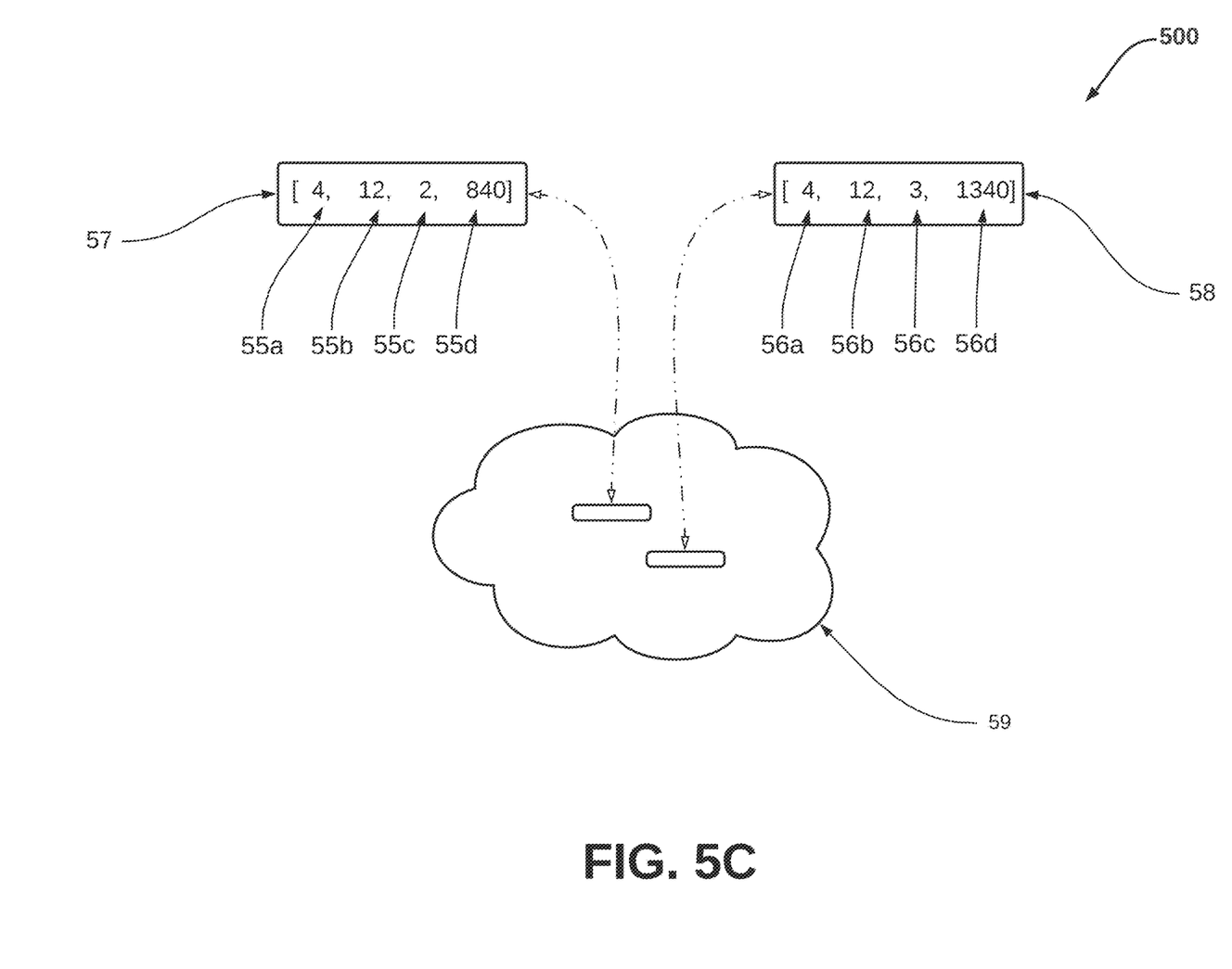

FIGS. 5A-5B-5C illustrate exemplary scenarios of usage of system 100 and/or system 200 described herein, in accordance with one or more implementations. FIGS. 5A-5B may illustrate scenario 500 including a first page 50, a second page 52, and/or other components. In some implementations, first page 50 and second page 52 may be part of a document bundle. The document bundle may include page break 54 (shown in FIGS. 5A-5B as two interlinked circles). Page break 54 may represent a position in the document bundle between first page 50 and second page 52. In some implementations, page break 54 may have an index position relative to one or more other page breaks in the document bundle. First page 50 may include one or more features 51$a$-$d$. In some implementations, features 51$a$-$d$ may characterize the content included in first page 50, the formatting of the content in first page 50, and/or other page-specific information regarding first page 50. Second page 52 may include one or more features 53$a$-$d$. In some implementations, features 53$a$-$d$ may characterize the content included in second page 52, the formatting of the content in second page 52, and/or other page-specific information regarding second page 52. Features 51$a$ and 53$a$ may be the presence of a logo, and/or other features. Features 51$b$ and 53$b$ may be the presence of a barcode and/or other features. Features 51$c$ and 53$c$ may be the presence of one or more dates and/or other features. Features 51$d$ and 53$d$ may be the presence of a dollar amount (e.g., for a specific parameter, in this case "Ending Balance") and/or other features. In some implementations features 51$a$-$d$, features 53$a$-$d$, and/or other features may be obtained as feature information by a component similar to or the same as information component 108 and/or information component 210.

Referring to FIGS. 5A-5B, feature values 55$a$-$d$, feature values 56$a$-$d$, and/or other feature values and/or information may be determined for individual ones of features 51$a$-$d$, features 53$a$-$d$, and/or other features. In some implementations first page 50 and second page 52 may have features values that are the same or similar. Feature value 55$a$ may be a numerical representation of feature 51$a$ and feature value 56$a$ may be a numerical representation of feature 53$a$. Feature values 55$a$ and 56$a$ may be the same due to one or more of feature 51$a$ and 53$a$ being the same or similar. Similarly, feature value 55$b$ may be a numerical representation of feature 51$b$ and feature value 56$b$ may be a numerical representation of feature 53$b$. Feature values 55$b$ and 56$b$ may be the same due to one or more of feature 51$b$ and 53$b$ being the same or similar. In some implementations, first page 50 and second page 52 may have features values that are different due to differences in features. Feature 51$c$ may represent a date that is different than the date represented by feature 53$c$. Feature value 55$c$ may be a numerical representation of feature 51$c$ and feature value 56$c$ may be a numerical representation of feature 53$c$. By way of non-limiting example, feature 51$c$ refers to the date in the upper right corner of page 50 (shown as "02/01/XX through 02/08/XX) and may be represented numerically by feature value 55c as a value of '2'. Feature 53c refers to the date in the upper right corn of page 52 (shown as "03/01/XX through 03/08/XX") and may be represented numerically by feature value 56c as a value of '3'. Because feature 51c and 53c include different dates, the feature values 55c and 56c are determined to be different numerical values. Similarly, feature value 55d may be a numerical representation of feature 51d and feature value 56d may be a numerical representation of feature 53d. Because feature 51d and 53d include different dollar amounts, the feature values 55d and 56d are also determined to be different numerical values.

FIG. 5C also illustrates scenario 500. In some implementations, page-specific feature vectors may be generated for individual pages of the document bundle. A first page-specific feature vector 57 may pertain to first page 50 (depicted in FIG. 5A) and include feature values 55a-b (also depicted in FIG. 5A). A second page-specific feature vector 58 may pertain to second page 52 (depicted in FIG. 5B) and include feature values 56a-d (also depicted in FIG. 5B). In some implementations first page-specific feature vector 57 and/or second page-specific feature vector may be generated by a component that is the same or similar to vector component 110 and/or vector component 214 (depicted in FIG. 1 and FIG. 2, respectively). In some implementations, first page-specific feature vector 57 and second page-specific feature vector 58 may have the same dimension and/or length. Herein, first page-specific feature vector 57 and second page-specific feature vector 58 are shown to include decimal numbers, but in other implementations first page-specific feature vector 57, second page-specific feature vector 58, and/or other feature vectors may include binary representations (or encodings) of feature values.

Referring to FIG. 5C, first page-specific feature vector 57 and second page-specific feature vector 58 may be used by trained model 59. In some implementations trained model 59 may be the same as or similar to trained model 229 stored in electronic storage 228 (depicted in FIG. 2). In some implementations, model 59 may compare first page-specific feature vector 57 and second page-specific feature vector 58 to determine if first page 50 and second page 52 are part of the same document. Comparison of first page-specific feature vector 57 and second page-specific feature vector 58 may include comparison of the feature values included in first page-specific feature vector 57 and second page-specific feature vector 58. In some implementations feature value 55a may be compared to 56a, feature value 55b may be compared to 56b, feature value 55c may be compared to 56c, feature value 55d may be compared to 56d, and/or other comparison. In some implementations, model 59 may determine that first page 50 and second page 52 may be part of the same document.

Figure 3:
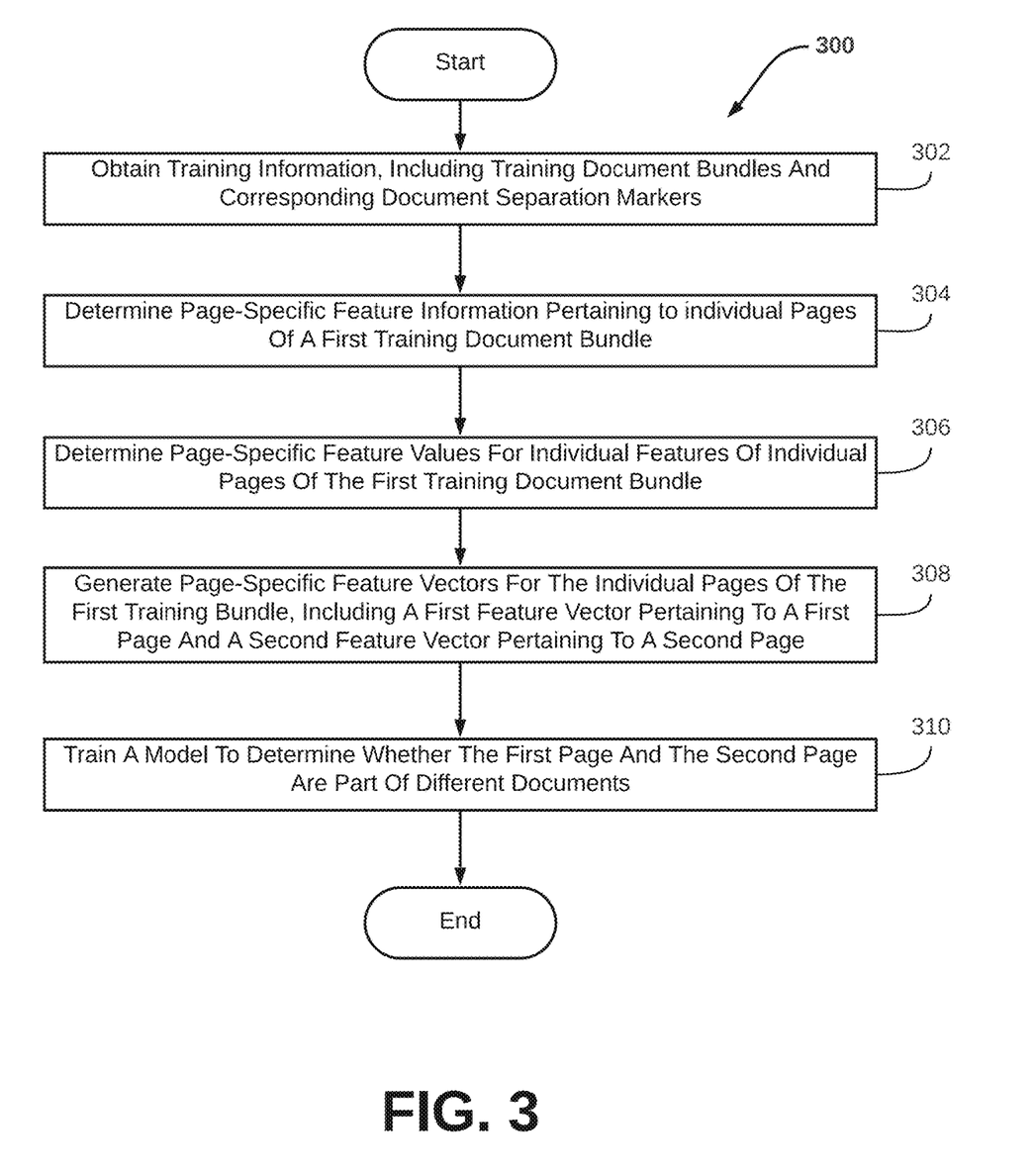
FIG. 3 illustrates a method to identify document transitions between adjacent documents within document bundles, in accordance with one or more implementations.

FIG. 3 illustrates a method 300 to identify document transitions between adjacent documents within document bundles, in accordance with one or more implementations. A document bundle may be a combination of two or more separate documents and/or may be stored in a single electronic file. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include obtaining training information. The training information may include training document bundles, document separation markers, and/or other information. The training document bundles may include a first training bundle. The first training bundle may combine at least a first document, a second document and/or other documents. The first document may include a first page and the second document may include a second page. The training bundles may correspond to one or more document separation markers in the obtained training information. A document separation marker may indicate where a document transition occurs. A document transition may be a page break in the first document bundle where the first document ends and the second document begins. Operation 302 may be performed by a component that is the same as or similar to information component 108 (shown in FIG. 1), in accordance with one or more implementations.

An operation 304 may include determining page-specific feature information pertaining to individual pages of the first training bundle. The page-specific information pertaining to an individual page may characterize features of the individual page for which feature information is obtained. The page-specific feature information may include first page-specific feature information pertaining to the first page and/or second page-specific feature information pertaining to the second page. Operation 304 may be performed by one or more hardware processors configured by machine-readable instructions including a component that is the same as or similar to information component 108 (shown in FIG. 1), in accordance with one or more implementations.

An operation 306 may include determining, based on the obtained page-specific feature information, page-specific feature values for individual features of the individual pages of the first training bundle. The page-specific feature values may numerically represent the individual features of the individual pages. First page-specific feature values may be determined for the first page, based on the first page-specific feature information. Second page-specific feature values may be determined for the second page, based on the second page-specific feature information. Operation 306 may be performed by one or more hardware processors configured by machine-readable instructions including a component that is the same as or similar to vector component 110 (shown in FIG. 1), in accordance with one or more implementations.

An operation 308 may include generating, for the individual pages of the first training bundle, a page-specific feature vector. A first page-specific feature vector pertaining to the first page may be generated and may include the first page-specific feature values. A second page-specific feature vector pertaining to the second page may be generated and may include the second page-specific feature values. The individual page-specific feature vectors may have a fixed dimension. Operation 308 may be performed by one or more hardware processors configured by machine-readable instructions including a component that is the same as or similar to vector component 110 (shown in FIG. 1), in accordance with one or more implementations.

An operation 310 may include training a model, using the training document bundles, to determine whether the first page and the second page are part of different documents. The model may make a determination based on comparing the first page-specific feature vector and the second page-specific feature vector. Training the model may include comparing the determination with the obtained corresponding document separation markers. Operation 310 may be performed by one or more hardware processors configured by machine-readable instructions including a component that is the same as or similar to training component 112 (shown in FIG. 1), in accordance with one or more implementations.

Figure 4:
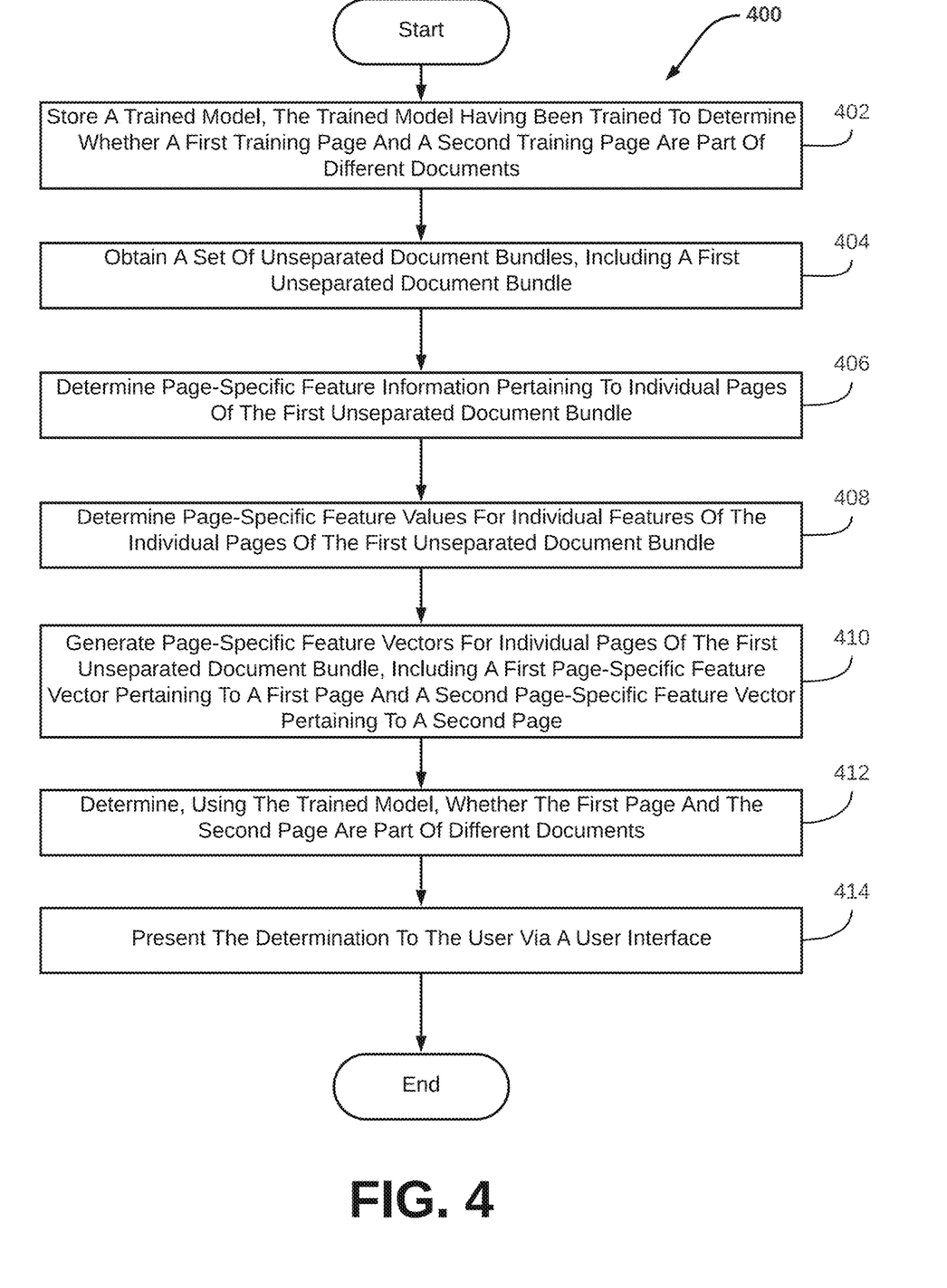
FIG. 4 illustrates a method to utilize a trained model to identify document transitions between adjacent documents within document bundles, in accordance with one or more implementations.

FIG. 4 illustrates a method 400 to utilize a trained model to identify document transitions between adjacent documents within document bundles, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include storing, via electronic storage, the trained model. The trained model may have been trained to determine whether a first training page and a second training page are part of different documents. The trained model may make a determination based on comparing a first training-page-specific feature vector pertaining to the first training page and the second training-page-specific feature vector pertaining to the second training page. The first training-page-specific feature vector may include a first set of page-specific feature values that numerically represent individual features of the first training page. The second training-page-specific feature vector may include a second set of page-specific feature values that numerically represent individual features of the second training page. Operation 402 may be performed by one or more hardware processors configured by machine-readable instructions including a component that is the same as or similar to model component 208 (shown in FIG. 2), in accordance with one or more implementations.

An operation 404 may include obtaining a set of unseparated document bundles. The set of unseparated document bundles may include a first unseparated document bundle. The first unseparated document bundle may be stored in a single electronic file. The first unseparated document bundle includes a first page and a second page. Operation 404 may be performed by one or more hardware processors configured by machine-readable instructions including a component that is the same as or similar to document component 210 (shown in FIG. 2), in accordance with one or more implementations.

An operation 406 may include determining page-specific feature information pertaining to individual pages of the first unseparated bundle. The page-specific information pertaining to an individual page may characterize features of the individual page for which feature information is obtained. Operation 406 may be performed by one or more hardware processors configured by machine-readable instructions including a component that is the same as or similar to information component 212 (shown in FIG. 2), in accordance with one or more implementations.

An operation 408 may include determining, based on the obtained page-specific feature information, page-specific feature values for individual features of the individual pages of the first unseparated bundle. The page-specific feature values may numerically represent the individual features for which feature information is obtained. First page-specific feature values may be determined for the first page and/or second page-specific feature values may be determined for the second page. Operation 408 may be performed by one or more hardware processors configured by machine-readable instructions including a component that is the same as or similar to vector component 214 (shown in FIG. 2), in accordance with one or more implementations.

An operation 410 may include generating, for individual pages of the first unseparated bundle, a page-specific feature vector. A first page-specific feature vector pertaining to the first page may be generated and may include the first page-specific feature values. A second page-specific feature vector pertaining to the second page may be generated and may include the second page-specific feature values. The individual page-specific feature vectors may have a fixed dimension. Operation 410 may be performed by one or more hardware processors configured by machine-readable instructions including a component that is the same as or similar to vector component 214 (shown in FIG. 2), in accordance with one or more implementations.

An operation 412 may include determining, using the trained model, whether the first page and the second page are part of different documents based on a comparison of the first page-specific feature vector and the second page-specific feature vector. A determination that the first page and the second page are part of different documents may indicate that a document transition occurs between the first page and the second page. Operation 412 may be performed by one or more hardware processors configured by machine-readable instructions including a component that is the same as or similar to determination component 216 (shown in FIG. 2), in accordance with one or more implementations.

An operation 414 may include presenting to the user, via a user interface, the determination whether the document transition occurs between the first page and the second page. Operation 414 may be performed by one or more hardware processors configured by machine-readable instructions including a component that is the same as or similar to presentation component 218 (shown in FIG. 2), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to identify document transitions between adjacent documents within document bundles, wherein a document bundle is a combination of two or more separate documents, and wherein the document bundle is stored in a single electronic file, the system comprising:
   one or more hardware processors configured by machine-readable instructions to:
      obtain training information, wherein the training information includes training document bundles and corresponding document separation markers, wherein the training document bundles include a first training bundle combining at least a first document and a second document, wherein a document separation marker indicates where a document transition occurs, wherein a document transition is a page break in the first training bundle where the first document ends and the second document begins, wherein the first document includes a first page, and wherein the second document includes a second page;
      determine page-specific feature information pertaining to individual pages of the first training bundle, wherein the page-specific information pertaining to an individual page characterizes features of the individual page for which feature information is obtained, and wherein the page-specific feature information includes first page-specific feature information pertaining to the first page and second page-specific feature information pertaining to the second page;
      determine, based on the obtained page-specific feature information, page-specific feature values for individual features of the individual pages of the first training bundle, wherein the page-specific feature values numerically represent the individual features of the individual pages, and wherein first page-specific feature values are determined for the first page, based on the first page-specific feature information, and wherein second page-specific feature values are determined for the second page, based on the second page-specific feature information;
      generate, for the individual pages of the first training bundle, a page-specific feature vector, such that a first page-specific feature vector pertaining to the first page is generated and is based on the first page-specific feature values, and a second page-specific feature vector pertaining to the second page is generated and is based on the second page-specific feature values, and wherein the individual page-specific feature vectors have a fixed dimension; and
      train a model, using the training document bundles, to determine whether the first page and the second page are part of different documents, wherein training the model includes construction of a decision tree, wherein the decision tree is constructed based on comparisons of page pairs of the training document bundles, and wherein individual page pairs include a first page and a second page of the training document bundles, wherein the model makes a determination based on comparing the first page-specific feature vector and the second page-specific feature vector, wherein the first page-specific feature vector and the second page-specific feature vector have the same dimension, wherein a first set of bits at a given index of the first page-specific feature vector represents the same feature as a second set of bits at the given index of the second page-specific feature vector, and wherein the first set of bits and the second set of bits have the same bit length, and wherein training the model includes comparing the determination with the obtained corresponding document separation markers.

2. The system of claim 1, wherein the decision tree includes one or more nodes, wherein the nodes are separated into one or more tree levels, and wherein comparisons between the first page-specific feature vector and the second page-specific feature vector include traversing through the one or more tree levels of the decision tree.

3. The system of claim 1, wherein the comparison of the first page-specific feature vector and the second page-specific feature vector includes a comparison of the first set of bits at a given index of the first page-specific feature vector and the second set of bits at the given index of the second page-specific feature vector.

4. The system of claim 3, wherein comparison of the first set of bits at the given index of the first page-specific feature vector with the second set of bits at the given index of the second page-specific feature vector results in a determination, and wherein the determination effectuates a transition in the decision tree from a first node in a first tree level to a second node in a second tree level.

5. A method for identifying document transitions between adjacent documents within document bundles, wherein a document bundle is a combination of two or more separate documents, and wherein the document bundle is stored in a single electronic file, the method comprising:
   obtaining training information, wherein the training information includes training document bundles and corresponding document separation markers, wherein the training document bundles include a first training bundle combining at least a first document and a second document, wherein a document separation marker indicates where a document transition occurs, wherein a document transition is a page break in the first training bundle where the first document ends and the second document begins, wherein the first document includes a first page, and wherein the second document includes a second page;
   determining page-specific feature information pertaining to individual pages of the first training bundle, wherein the page-specific information pertaining to an individual page characterizes features of the individual page for which feature information is obtained, and wherein the page-specific feature information includes first page-specific feature information pertaining to the first page and second page-specific feature information pertaining to the second page;
   determining, based on the obtained page-specific feature information, page-specific feature values for individual features of the individual pages of the first training bundle, wherein the page-specific feature values numerically represent the individual features of the individual pages, and wherein first page-specific feature values are determined for the first page, based on the first page-specific feature information, and wherein second page-specific feature values are determined for the second page, based on the second page-specific feature information;
   generating, for the individual pages of the first training bundle, a page-specific feature vector, such that a first page-specific feature vector pertaining to the first page is generated based on the first page-specific feature values, and a second page-specific feature vector pertaining to the second page is generated based on the second page-specific feature values, and wherein the individual page-specific feature vectors have a fixed dimension; and training a model, using the training document bundles, to determine whether the first page and the second page are part of different documents, wherein training the model includes construction of a decision tree, wherein the decision tree is constructed based on comparisons of page pairs of the training document bundles, wherein individual page pairs include a first page and a second page of the training document bundles, wherein the model makes a determination based on comparing the first page-specific feature vector and the second page-specific feature vector, wherein the first page-specific feature vector and the second page-specific feature vector have the same dimension, wherein a first set of bits at a given index of the first page-specific feature vector represents the same feature as a second set of bits at the given index of the second page-specific feature vector, and wherein the first set of bits and the second set of bits have the same bit length, and wherein training the model includes comparing the determination with the obtained corresponding document separation markers.

6. The method of claim 5, wherein the decision tree includes one or more nodes, wherein the nodes are separated into one or more tree levels, and wherein comparisons between the first page-specific feature vector and the second page-specific feature vector include traversing through the one or more tree levels of the decision tree.

7. The method of claim 5, wherein the comparison of the first page-specific feature vector and the second page-specific feature vector includes a comparison of the first set of bits at the given index of the first page-specific feature vector and the second set of bits at the given index of the second page-specific feature vector.

8. The method of claim 7, wherein comparison of the first set of bits at the given index of the first page-specific feature vector with the second set of bits at the given index of the second page-specific feature vector results in a determination, and wherein the determination effectuates a transition in the decision tree from a first node in a first tree level to a second node in a second tree level.

* * * * *